US010952263B2

(12) United States Patent
Ringland et al.

(10) Patent No.: US 10,952,263 B2
(45) Date of Patent: Mar. 16, 2021

(54) AUTOMATIC DEVICE PAIRING (71) Applicant: British Telecommunications Public Limited Company, London (GB)

(72) Inventors: Simon Ringland, London (GB); James Gardiner, London (GB)

(73) Assignee: British Telecommunications Public Limited Company, London (GB)

( * ) Notice: Subject to any disclaimer, the term of this patent is extended or adjusted under 35 U.S.C. 154(b) by 78 days.

(21) Appl. No.: 16/475,270

(22) PCT Filed: Dec. 20, 2017

(86) PCT No.: PCT/EP2017/083888
§ 371 (c)(1),
(2) Date: Jul. 1, 2019

(87) PCT Pub. No.: WO2018/122073
PCT Pub. Date: Jul. 5, 2018

(65) Prior Publication Data
US 2019/0335516 A1 Oct. 31, 2019

(30) Foreign Application Priority Data
Dec. 30, 2016 (EP) .................................. 16207552

(51) Int. Cl.
*H04W 76/10* (2018.01)
*G06F 16/953* (2019.01)
(Continued)

(52) U.S. Cl.
CPC .......... *H04W 76/10* (2018.02); *G06F 16/953* (2019.01); *H04W 12/003* (2019.01);
(Continued)

(58) Field of Classification Search
CPC ......... H04W 12/003; H04W 12/00409; H04W 12/00516; H04W 12/06; H04W 76/10;
(Continued)

(56) References Cited
U.S. PATENT DOCUMENTS 7,277,424 B1 * 10/2007 Dowling ............. H04M 3/5191
370/352
8,555,344 B1 10/2013 Wiedmann et al.
(Continued)

FOREIGN PATENT DOCUMENTS

EP 2493147 A1 8/2012
EP 2608590 A1 6/2013
(Continued)

OTHER PUBLICATIONS

European Search Report for Application No. 16207617.8, dated May 16, 2017, 7 pages.
(Continued)

*Primary Examiner* — Kevin D Mew
(74) *Attorney, Agent, or Firm* — Patterson Thuente Pedersen, P.A.

(57) ABSTRACT

The disclosure concerns automatic pairing of a user's new device wirelessly with the user's private wireless access point. An open WLAN is used to connect a wireless pairing client (WPC) in the device with a pairing initiation server (PIS) in an ISP's network. If the open WLAN uses a "captive portal" to redirect HTTPS requests to a login page, a "pinhole" is provided so that HTTP requests addressed to the PIS are not redirected. The device stores the SSID of a suitable open WLAN and connects automatically when powered up. The WPC makes an HTTP request, including an ID for the device, to the PIS. The PIS uses the device ID to retrieve an IP address of the user's access point. The PIS then sends instruction to WPS Pairing Initiator Clients, the
(Continued)

device and the access point to initiate a Wi-Fi Protected Setup PBC procedure. The result is that, if they are in range of each other, the device will pair with the user's private wireless LAN using WPS PBC but without the need for the user herself needing to act beyond simply powering up the new device.

6 Claims, 4 Drawing Sheets

(51) Int. Cl.
  *H04W 12/00* (2021.01)
  *H04W 12/06* (2021.01)
  *H04L 29/08* (2006.01)
  *H04W 84/12* (2009.01)

(52) U.S. Cl.
  CPC ............. *H04W 12/06* (2013.01); *H04L 67/02* (2013.01); *H04W 84/12* (2013.01)

(58) Field of Classification Search
  CPC ..... H04W 76/11; H04W 76/15; H04W 84/12; H04L 67/02; G06F 16/953
  See application file for complete search history.

(56) References Cited

U.S. PATENT DOCUMENTS

| | | | |
|---|---|---|---|
| 9,078,137 | B1 | 7/2015 | Chechani et al. |
| 2002/0032855 | A1* | 3/2002 | Neves ................ H04L 61/2521 713/154 |
| 2003/0004937 | A1* | 1/2003 | Salmenkaita ....... H04L 67/2819 |
| 2003/0078965 | A1* | 4/2003 | Cocotis .................. H04L 67/02 709/203 |
| 2003/0079030 | A1* | 4/2003 | Cocotis ................ G06F 3/1226 709/229 |
| 2007/0206527 | A1 | 9/2007 | Lo et al. |
| 2007/0287450 | A1 | 12/2007 | Yang et al. |
| 2009/0019134 | A1* | 1/2009 | Bellifemine .......... H04W 12/06 709/218 |
| 2011/0280180 | A1* | 11/2011 | McCann ............... H04W 48/14 370/328 |
| 2011/0314145 | A1* | 12/2011 | Raleigh ............. H04W 12/0808 709/224 |
| 2013/0013757 | A1 | 1/2013 | Millington et al. |
| 2013/0198817 | A1 | 8/2013 | Haddad et al. |
| 2013/0347073 | A1 | 12/2013 | Bryksa et al. |
| 2014/0355579 | A1 | 12/2014 | Viswanathan et al. |
| 2015/0043377 | A1 | 2/2015 | Cholas et al. |
| 2015/0067819 | A1* | 3/2015 | Shribman ............. H04L 63/029 726/12 |
| 2015/0072653 | A1 | 3/2015 | Fan et al. |
| 2015/0200882 | A1* | 7/2015 | Raleigh ............... H04L 63/0428 713/168 |
| 2015/0257008 | A1 | 9/2015 | Benson et al. |
| 2016/0050710 | A1 | 2/2016 | Hagan |
| 2016/0241541 | A1 | 8/2016 | Soelberg et al. |
| 2018/0367619 | A1* | 12/2018 | Jung ..................... H04L 67/141 |
| 2019/0116493 | A1* | 4/2019 | Cyril ....................... H04W 8/02 |
| 2019/0334794 | A1* | 10/2019 | Halepovic ............. H04L 43/026 |
| 2019/0335323 | A1 | 10/2019 | Ringland et al. |
| 2019/0335324 | A1 | 10/2019 | Ringland et al. |

FOREIGN PATENT DOCUMENTS

| | | |
|---|---|---|
| EP | 2986038 A1 | 2/2016 |
| GB | 2494920 A | 3/2013 |
| JP | 2015 162826 A | 9/2015 |
| WO | WO-2007127162 A2 | 11/2007 |
| WO | WO 2018/122073 A1 | 7/2018 |
| WO | WO 2018/122074 A1 | 7/2018 |
| WO | WO 2018/122076 A1 | 7/2018 |

OTHER PUBLICATIONS

European Search Report for Application No. 16207620.2, dated May 16, 2017, 7 pages.
International Preliminary Report on Patentability for Application No. PCT/EP2017/083888, dated Jul. 11, 2019, 8 pages.
International Preliminary Report on Patentability for Application No. PCT/EP2017/083889, dated Jul. 11, 2019, 7 pages.
International Preliminary Report on Patentability for Application No. PCT/EP2017/083914, dated Jul. 11, 2019, 8 pages.
International Search Report and Written Opinion for Application No. PCT/EP2017/083889, dated Apr. 11, 2018, 10 pages.
International Search Report and Written Opinion for Application No. PCT/EP2017/083914, dated Feb. 2, 2018, 10 pages.
International Search Report for Application No. PCT/EP2017/063889, dated Apr. 11, 2018, 5 pages.
Search Report under Section 17 for Application No. 1622433.9, dated May 31, 2017, 3 pages.
Search Report Under Section 17 for GB Application No. GB 1622430.5, dated Jun. 1, 2017, 4 pages.
U.S. Appl. No. 16/475,280, filed Dec. 20, 2017, Inventor(s): Ringland et al.
U.S. Appl. No. 16/475,293, filed Dec. 20, 2017, Inventor(s): Ringland et al.
Extended European Search Report for Application No. 16207552.7, dated May 19, 2017 (8 pgs).
Great Britain Search Report Under Section 17 for Application No. GB1622419 8, dated May 23, 2017 (3 pgs).
International Search Report for Application No. PCT/EP2017/083888, filed Dec. 20, 2017, dated Mar. 8, 2018 (3 pgs).

* cited by examiner

Fig. 1

Fig. 2 the
AUTOMATIC DEVICE PAIRING

CROSS-REFERENCE TO RELATED APPLICATION

The present application is a National Phase entry of PCT Application No. PCT/EP2017/083888, filed Dec. 20, 2017, which claims priority from European Patent Application No. 16207552.7 filed Dec. 30, 2016, each of which is fully incorporated herein by reference.

TECHNICAL FIELD

This disclosure relates to a method for the automatic pairing of a device wirelessly with an access point of a wireless local area network, access points and devices for use in such a method, a pairing initiation server and a method performed by a pairing initiation server.

BACKGROUND

Since Apple Corporation first offered Wi-Fi, according to 802.11b, as an option on its iBook computers in 1999, Wi-Fi, operating under at least one of the IEEE 802.11 family of standards such as 802.11b, 802.11g, 802.11n-2.4, operating in the 2.400-2.500 GHz band, or 802.11a, 802.11ac and 802.11n operating in the 4.915-5.825 GHz band, and wireless LANs generally have become ubiquitous, deployed not just in commercial, retail and educational establishments, but also very significantly in domestic situations. It has been said that Wi-Fi's main use is in home networking, particularly since it became commonplace for domestic customers to have high speed broadband access. Wireless LANs in the home support desk-top, laptop and tablet computers, smartphones, Internet-connected televisions, set-top boxes, PVRs and other media devices—such as media servers and music-streamers, as they provide the easiest and most flexible way to connect such devices to the Internet.

The advent of the Internet of Things, IoT, in which almost anything might be connected to the Internet—from cars and other vehicles to dustbins, fridges, washing machines, dishwashers, ovens and coffee-makers, provides even greater incentive for wireless LANs to be deployed domestically in ever greater numbers.

Of course, much of the attraction of wireless LANs is that with a strong enough radio signal the WLAN can be accessed everywhere in the home, and even into the garden and beyond, all without the need to hook up a cable to get connected. But this same quality also means that, unless security measures are applied, passers-by and criminals can eavesdrop on WLAN traffic, freeload on the Internet connection or worse (e.g. introduce rogue packets, viruses, malware, etc.). It is usual therefore for domestic wireless LANs to be secured to at least the minimum level of requiring a password before access is granted.

Generally, nowadays, once a password has been entered into a device to obtain access to a wireless LAN, the device "remembers" the password so that subsequent attempts to access the wireless LAN do not require the password to be entered afresh. This is helpful, but it does mean that it is easy to forget one's Wi-Fi password—as one so rarely needs to provide it.

This of course then poses a problem when it comes to "installing" new devices that need Wi-Fi access—one needs to remember or retrieve the password for the wireless LAN for each new device. And of course, as with all passwords, users are encouraged to make Wi-Fi passwords long and complicated, with a mix of lower-case and upper-case letters, numbers and "special characters" (*&$£@?! etc.) which not only makes remembering precisely what the password is ("was it Wrexit16! or Wrecksit16£?) but it also makes it more likely that it will be mis-keyed at least once, and then there is the uncertainty of whether it was mis-keyed or whether one is entering the wrong password.

These problems stimulated the development by the Wi-Fi Alliance of Wi-Fi Protected Setup (WPS) which lets one join a secure Wi-Fi network without needing to select the network's name (SSID) and without entering the password: using Push Button Configuration (PBC) one simply needs to press one button on the WPS-enabled access point/router/gateway and press another button, real or virtual, on the new device to be joined, the two button presses being within two minutes of each other (the two minute interval is known as the "Walk Time"). This is a great boon, but it is not a complete solution—as sometimes one or other of the buttons is out of reach, often because the access point/router/gateway is behind a locked door or because the person desiring to join a new device to the LAN does not have the mobility needed to reach the relevant button. Even when both buttons are reachable, the two-minute window within which both buttons must be pressed can prove an insurmountable hurdle—especially when the new device to be paired and the access point/router/gateway cannot be brought together, such as when the new device is too large to be portable, or has to be installed before use, and resides in a different room, or on a different floor from the access point/router/gateway. For example, it is common for the access point/router/gateway to be installed in a living room or an office, yet nowadays domestic appliances ("whitegoods") such as refrigerators, washing machines, cookers, that are all installed in other rooms, are Wi-Fi enabled and need to be connected to a wireless LAN. It may not be possible for a user to move from the access point/router/gateway to the appliance within two minutes, especially if the user if elderly or infirm. Now that the range of wireless LANs is generally sufficient to extend to the garden or garage, the linking of garden and plant care systems, such as automatic watering systems or greenhouse monitoring equipment, to a domestic wireless LAN is becoming more common, yet it is unlikely to be possible for one person to use WPS button pushes in such situations.

Domestic appliance manufacturer Siemens offers Wi-Fi enabled domestic appliances such as refrigerators (with internal cameras so that householders can check the content of their fridges, using a smartphone, while out shopping, for example), cookers, and washing machines. These appliances are WPS enabled. But, in the event that WPS cannot be used effectively, a manual connection option can be used instead. In this option, after pressing various buttons on the appliance to turn on a wireless access point in the appliance to create a "Homeconnect" Wi-Fi network, the user connects her smartphone to the 'Homeconnect" network, opens an app on the smartphone, selects the name of the domestic wireless LAN and then keys in the password for that domestic network. This transfers the network name and password to the appliance. With a few more pushes of buttons on the appliance, the appliance is connected to the domestic wireless LAN—but of course this approach again requires the user to remember, and successfully key in the network password.

SUMMARY

There therefore exists a need for an alternative way to achieve pairing between a new device and a wireless LAN, such as a domestic Wi-Fi network, such as one that would be suitable for use when the new device cannot be brought close to the access point/router/gateway—for example because it needs to be installed in another room, or is too bulky to be moved with ease, and/or which might be used by those with restricted mobility, such as the elderly or infirm.

Additionally, as Apple Corporation has shown with its products, there is great appeal in devices that work straight out of the box: On this basis, "zero touch pairing", as proposed here, would likewise be very attractive to all users.

Accordingly, in a first aspect, an embodiment of the present disclosure provides a method for the automatic pairing of a device wirelessly with a secure wireless LAN provided by an access point, wherein said access point is a pairing access point providing the secure wireless LAN and an open wireless LAN, the method comprising: (i) associating the device with an access point of an open wireless LAN; (ii) sending a pairing initiation request from the device to the associated access point of the open wireless LAN, the pairing initiation request including a destination address for a pairing initiation server and an identifier for the device; (iii) forwarding the pairing initiation request from the associated access point to the pairing initiation server; (iv) using the device identifier received by the pairing initiation server to query a database to determine a network address for the pairing access point; (v) sending a pairing initiation instruction from the pairing initiation server to the pairing access point using the network address determined in (iv); (v) sending a pairing initiation instruction from the pairing initiation server to the device; (vi) responsive to receipt by the pairing access point of the instruction sent in (v), initiating pairing between the pairing access point and the device; and (vii) responsive to receipt by the device of the instruction sent in (vi) automatically triggering at the device pairing between the device and the secure wireless LAN.

Accordingly, in a second aspect, an embodiment of the present disclosure provides a device capable of connecting wirelessly with a secure wireless LAN provided by an access point, wherein said access point is a pairing access point providing the first secure wireless LAN and an open wireless LAN, the device comprising: memory means storing a network address of a pairing initiation server and a network identity for one or more open wireless LANs, including the open wireless LAN provided by the pairing access point, through which the pairing initiation server can be reached; the device including a pairing initiation client and being configured to: associate the device with an access point of an open wireless LAN whose network identity is stored in the memory means; send a pairing initiation request from the device to the associated access point of the open wireless LAN, the pairing initiation request including an identifier for the device and having as destination address the stored address of the pairing initiation server; and, in response to receiving an instruction from the pairing initiation server, to trigger, at the device, pairing between the device and the secure wireless LAN provided by the pairing access point, that has also been instructed by the pairing initiation server to initiate a pairing process.

In a third aspect, embodiments of the disclosure provide a pairing initiation server in combination with a database, the database storing device identities for devices capable of connecting wirelessly with a wireless LAN, each device identity being mapped to a corresponding user identity, and each user identity being mapped to a network address of an access point of a secure wireless LAN, so that knowing a device identity permits recovery of a network address of an access point of a secure wireless LAN, access to the secure wireless LAN requiring authentication; the pairing initiation server being configured to: query the database, in response to receiving a device identity, to retrieve a network address of an access point of a secure wireless LAN, access to the secure wireless LAN requiring authentication; send a pairing initiation instruction to an access point of a secure wireless LAN, wherein said access point is a pairing access point, using the retrieved network address to cause the pairing access point to initiate pairing with the device whose identity was received; send a pairing initiation instruction to the device whose identity was received, to cause automatic triggering at the device of pairing between the device and the pairing access point.

BRIEF DESCRIPTION OF THE DRAWINGS

Embodiments of the disclosure will now be described, by way of example only, with reference to the accompanying drawings, in which.

DETAILED DESCRIPTION

Figure 1:
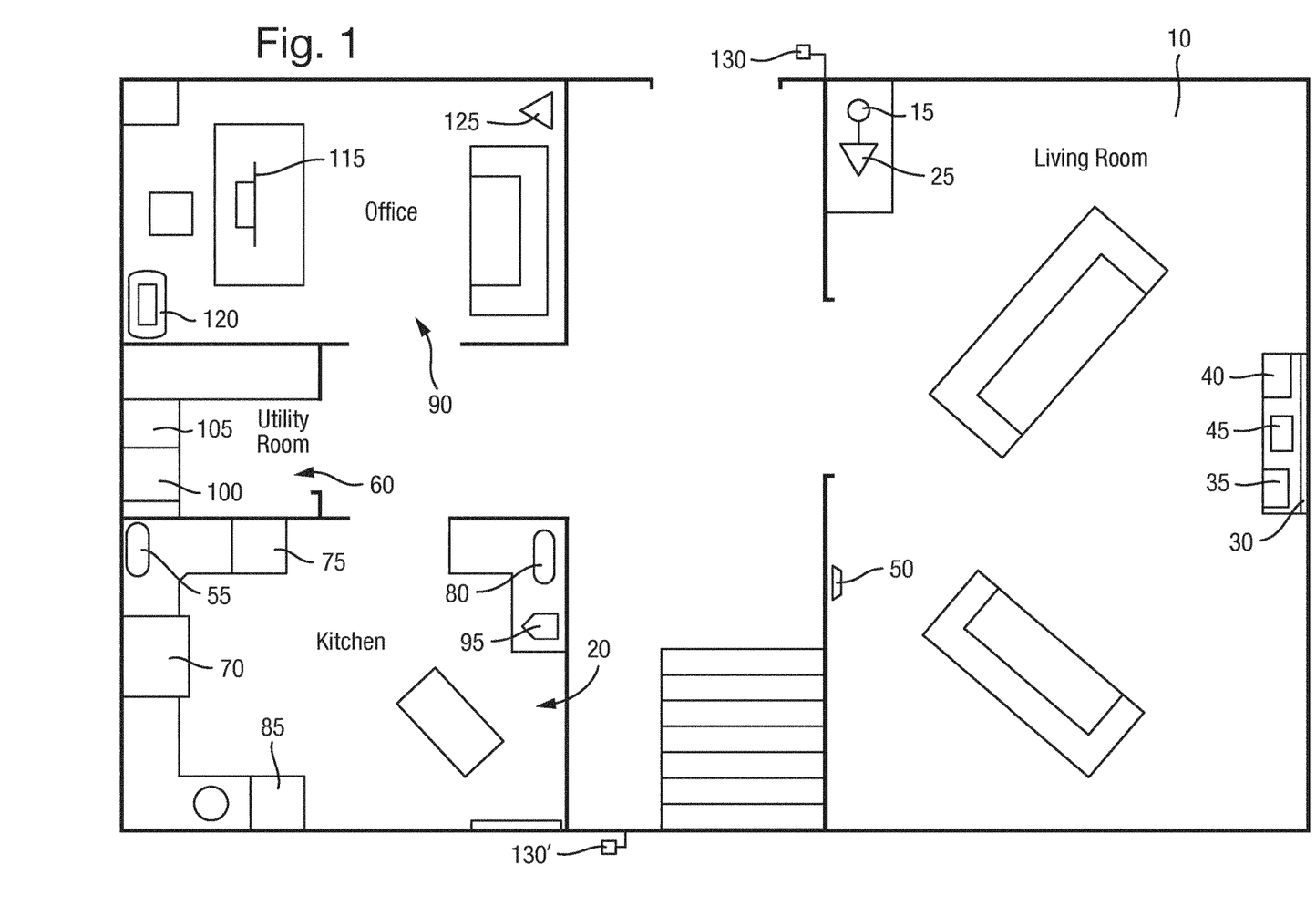
FIG. 1 is a partial plan view of a house showing an arrangement of devices that are connected to a private domestic wireless LAN.

FIG. 1 is a partial plan view of a house showing an arrangement of devices that are connected to a private domestic wireless LAN. In "living room" 10, broadband network access is provided by DSL router 15, a wired, Ethernet, connection is provided from the router 15 to an access point 25 for a secure wireless LAN that serves the entire house. In the same room are a wall-mounted "smart" television 30 that connects, via the wireless LAN, to the DSL router 15 and hence to the Internet. A set-top box 35, a PVR 40, and a computer gaming console 45, each have wired HDMI connections to the television as well as being connected wirelessly to the wireless LAN. Also provided in this room is room thermostat 50 that connects, via the wireless LAN, to the central heating boiler 55 that is wall-mounted in the kitchen, 20.

In the kitchen, smart appliances (IoT devices) are connected, via the wireless LAN, to the Internet. These include a refrigerator 70, oven 75, microwave oven 80, and dishwasher 85. A coffee machine 95 is also connected to the wireless LAN and hence to the Internet.

In the laundry/utility room 60, the washing machine 100, and tumble drier 105, are again smart appliances that connect to the Internet via the wireless LAN.

In the office 90, a desktop computer 115, printer 120 and media-server 125 connect to the wireless LAN and hence to the Internet.

On the upper floors, not shown, there is a Wi-Fi extender that connects wirelessly to the wireless LAN, and each bedroom has a wall-mounted smart TV, plus PVR and set-top-box, that connect to the wireless LAN to receive video content streamed over the Internet, as well as remote-controlled loudspeakers to receive music distributed by the media server.

Video security cameras 130, 130', monitor the front and rear entrances to the house, and connect via the wireless LAN to the Internet. Also not shown are the automated, internet-enabled watering systems in the house's garden and greenhouse.

In addition to these fixed devices, the householders have personal smartphones, tablet computers and health trackers that connect to the wireless LAN when they come into range of it. All of these devices, and their replacements need, at some stage to be provided with the login credentials, e.g. SSID and password, needed to access the secure wireless LAN.

Figure 2:
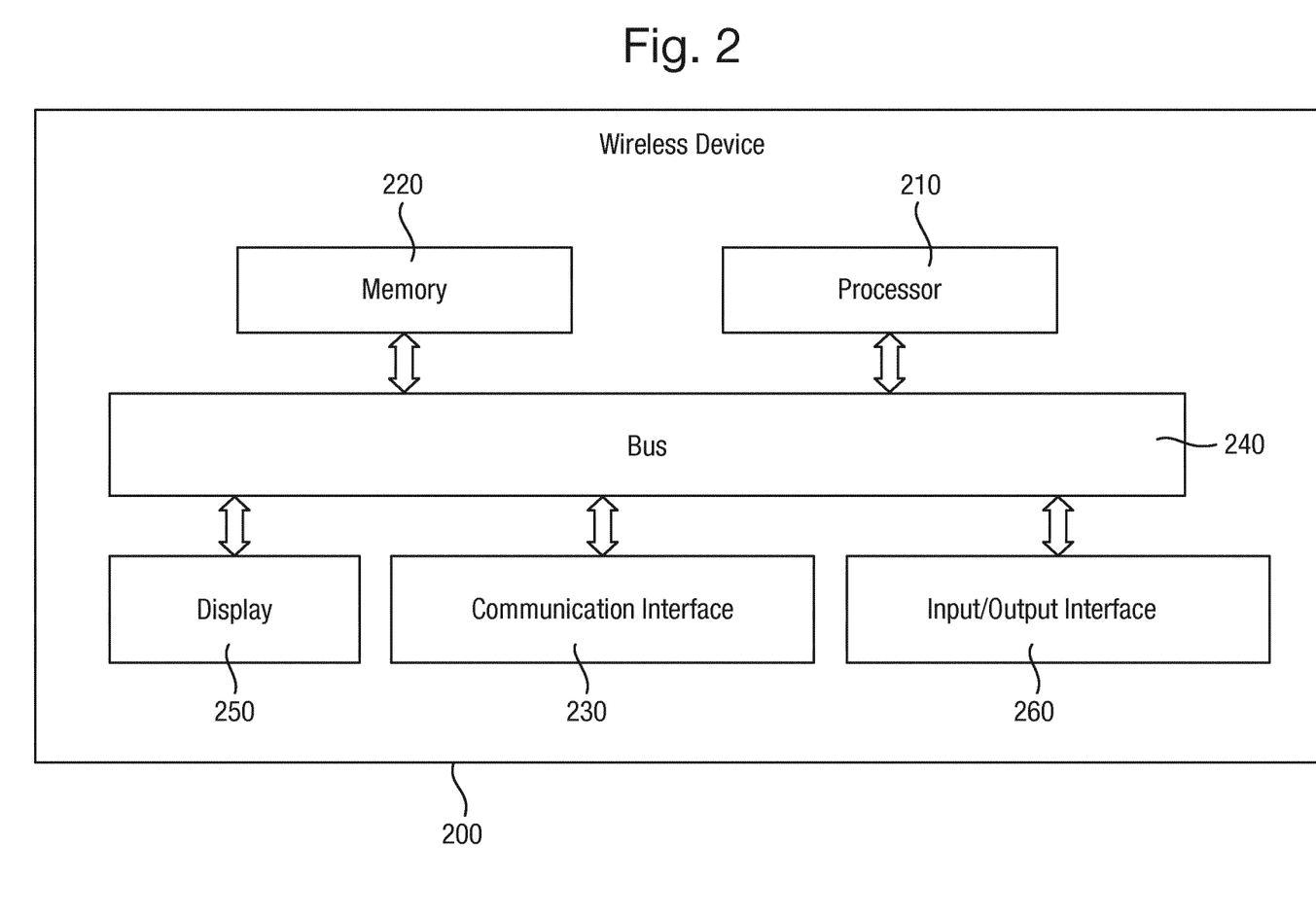
FIG. 2 is a schematic diagram of a device for use with a wireless LAN.

Although all of the devices shown in FIG. 1 have different functions, capabilities and uses, they share several common features relevant to their use with the wireless LAN. FIG. 2 represents a generic wireless LAN enabled device, e.g. a Wi-Fi enabled device, 200. The device includes a processor 210, coupled to a memory 220, and a communication interface 230, by a bus 240. In addition, the generic device may include a visual display 250, to output messages, conditions and queries, to a user, as well as an input/output interface 260. If present, the input interface and the display may be combined as a touch screen that both enables and accepts inputs, as well as providing visual outputs. Some simple devices, for example, health trackers, may have neither input/output interface nor a display. The communication interface includes a wireless interface, including RF circuitry, suitable for transmitting to and receiving from a wireless LAN. This may take the form of a transceiver. The wireless interface and RF circuitry may be capable of communicating over multiple frequency bands and using various modulation techniques, according to the nature of the wireless LAN(s) with which the device will be used.

Whenever a new device is to be introduced to the house and paired with the secure wireless LAN, it is necessary to provide the new device with the network identity, e.g. the SSID, and the password, or key, in order that the device can pair with and access the secure network. As explained above, for many people—notably the elderly, infirm, or the less able, and in many circumstances even for the fully able-bodied, it is often difficult and time-consuming to provide the relevant credentials to a new device.

Figure 3:
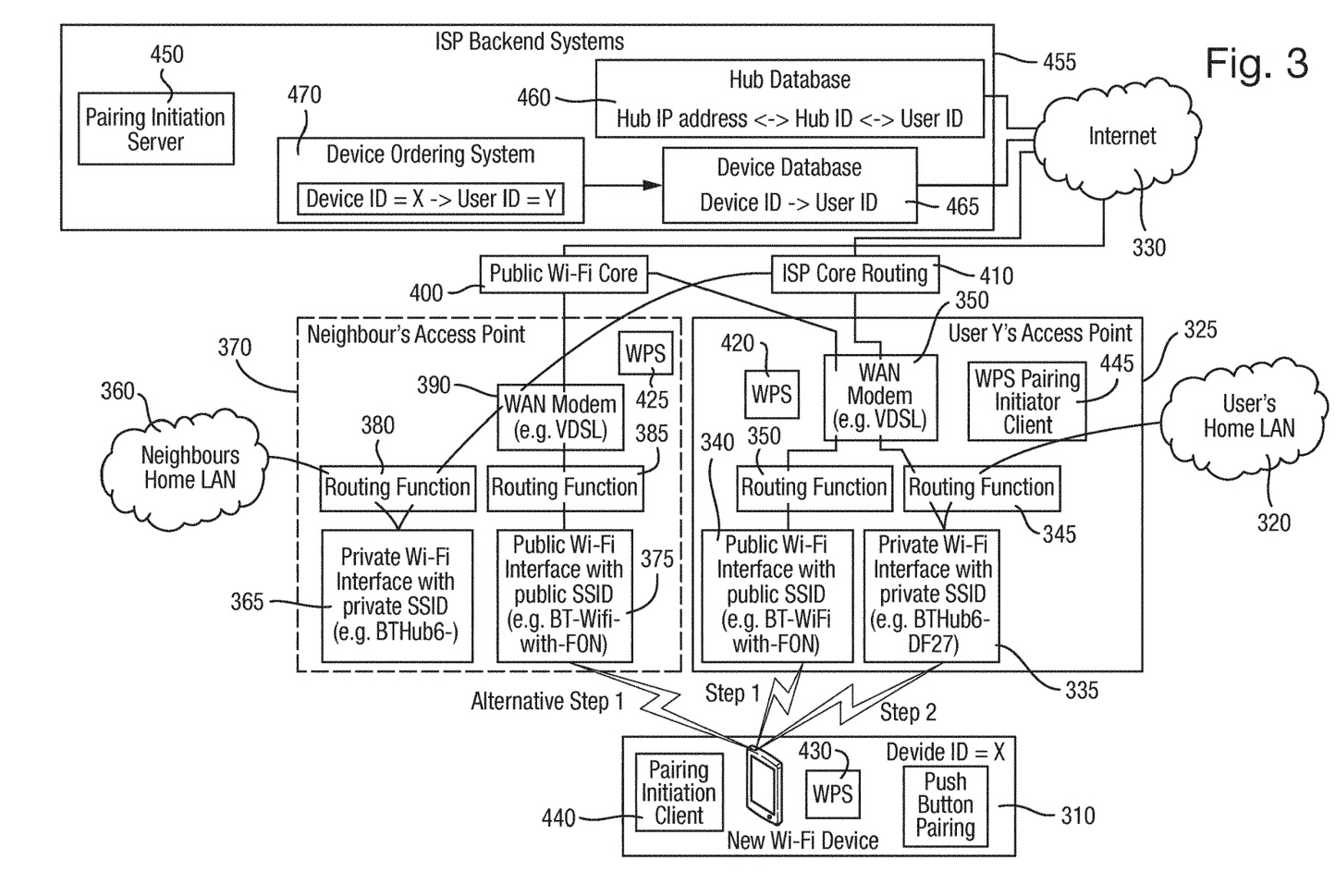
FIG. 3 is a schematic diagram showing the entities involved in an automatic pairing method according to an embodiment of the disclosure.

FIG. 3 shows a new Wi-Fi enabled device 310, that a user would like to use to connect to the user's secure home wireless LAN network 320, that is provided by the user's access point 325, so that the device 310, can connect to the Internet 330. In the example illustrated in FIG. 3, the user's access point is provided by a BT Home Hub 5, which is a residential gateway router that includes a wireless access point and a WAN modem 350, which in this case is a VDSL modem. The wireless access point 325 broadcasts multiple SSIDs because it supports multiple Wi-Fi networks. These include a private network of the user—WLAN 320, with the SSID "BTHub6-DF27", which uses a Wi-Fi interface 335, and at least one unsecured or "open" public network, shown here with the SSID "BT-WiFi-with-FON" which uses Wi-Fi interface 340, and which is a closed community network accessible to members and other paying customers.

Because the network provided via interface 340 is an "open network", a device can associate to it and be issued with an IP address without requiring any credentials. For each of these Wi-Fi interfaces 335 and 340, a router function 345 and 350 is provided.

FIG. 3 also shows a corresponding set up in a neighboring property, where a neighbor's private home WLAN 360, with SSID BTHub6-XY96 is provided by Wi-Fi interface 365 of an access point 370, which is shown here as another BT Home Hub 5. This also supports an unsecured public network, via Wi-Fi interface 375 which in this example is shown as having the SSID BT-Wi-Fi-with-FON. Again, routing functions 380 and 385 are provided for each of the interfaces 365 and 375. Finally, the access point 370, includes a WAN modem, 390.

The public Wi-Fi provided over the interfaces 340 and 375 connects, via routing functions 350 and 385, and modems 350 and 390 to a public Wi-Fi core network 400 by means of which access can be provided to the Internet 330. Conversely, the private WLANs 335 and 365 each connect, via their respective routing functions 345 and 380, and modems 350 and 390, to the core routing 410, provided by their respective Internet service providers (ISPs)—which, in the example shown, are the same, both being BT. The two access points 325 and 370 along with the new Wi-Fi device 310, each have WPS buttons 420, 425 and 430. The WPS button 430 on the device 310 can be a virtual button, e.g. provided as an image on a visual display of the device, rather than a physical button—as is likely to be the case when the device is, for example, a smartphone or a tablet computer.

As described thus far, the set-up is conventional. The new device 310 could be coupled with either of the access points 325 or 370, if in range, by pressing the relevant WPS button 420 or 425 and then, within two minutes, pressing the WPS button 430 on the device, 310.

In order to facilitate automatic pairing, each of the device and the user's access point 325 includes a wireless pairing initiation client 440 and 445. The neighbor's access point 370 may or may not include its own wireless pairing initiation client, not shown, but this is not relevant to achieving automatic pairing between the new device 310 and the user's access point 325. The wireless pairing initiator clients 440 and 445 have a counterpart, in the form of a pairing initiation server 450, in the backend systems 455 of the ISP. The backend systems also include database functionality with one databases, the "Hub Database" 460, storing associations between a user identity, an identity for that user's access point, and the IP address of that access point. The other, the "Device Database" 465, stores a mapping between an identifier for the new Wi-Fi device 310 and the user. The information in the Device Database comes from a Device Ordering System 470 that can be part of the ISP's operation. When a user places an order for a new device 310 with the Device Ordering System 470 the user's identity is uniquely captured—using for example an e-mail address, a phone number, an account code, or a customer number, along with a unique ID for the device. This device ID could, for example, be a serial number, a NIC address, or a MAC address. If the Device Ordering System is part of the ISP's backend systems 455, it is straightforward to connect the Device Ordering System 470 to the Device Database 465 so that the latter is updated automatically as soon as a user places an order. But even if the Device Ordering System is run by a separate organization, it would be straightforward to provide the device/user ID couple to the ISP's Device Database 465 provided the order is placed with a supplier who will capture and supply to the ISP, along with the device ID, a unique customer ID that is, or can be mapped to, a unique customer ID known to the ISP.

The operation of the system illustrated in FIG. 3 will now be described. In essence, the device 310 is configured so that it will connect to a Wi-Fi network, usually an open Wi-Fi network, which is then used by the device's Wireless Pairing Client 440 to message the Pairing Initiation Server 450. The Pairing Initiation Server 450 on receiving a message from the Wireless Pairing Initiation Client 440 that includes the device's ID, uses that ID to obtain the linked user ID and hence the IP address of the access point 325. The Pairing Initiation Server 450 then sends an instruction to the WPS Pairing Initiator Client 445 in the access point 325 to get it to initiate WPS pairing. The Pairing Initiation Server 450 then sends an instruction to the Pairing Initiation Client 440 in the device to trigger pairing with the access point 325 using WPS.

This can be achieved as follows. A user who is an existing customer of the ISP logs into her ISP account and orders a new Wi-Fi device 310. The device 310 has a Pairing Initiation Client 440 pre-installed on it, which specifies SSID for the (open) Wi-Fi network to which the device will connect when it is first powered up. In this case, because it is desired to connect to the open network BT-WiFi-with-FON, this is the SSID set on the device 310. If there is more than one suitable network, multiple SSIDs can be stored. The Pairing Initiation Client 440 on the device 310 is also arranged to receive notifications when the device connects on Wi-Fi, so that it can respond when connection is achieved. The organization shipping the device logs the serial number, or the NIC or MAC address of the device against the order and customer identity. These data are then stored in a database, in this case the Device Database 465.

The device 310 is shipped to the user. When the user activates the device, by powering it up or plugging it into a supply of power, the Pairing Initiation Client 440 in the device listens for connection notifications and waits till it receives notification that the device has connected to a WLAN with an SSID set by the Pairing Initiation Client 440. The connection process involves the usual Wi-Fi authentication and association process that does not involve login credentials. It doesn't matter whether the device 310 connects to the user's access point 325 or their neighbor's access point 370 (or some other access point providing BT-WiFi-with-FON).

BT-WiFi-with-FON is currently configured in such a way that a login procedure must generally be completed to gain access to the Internet, this is because the service is in effect restricted to "registered" users or paying guests, i.e. those with authentication credentials. This involves an authentication process, and to this end HTTP requests are blocked in a "captive portal" until the user has completed authentication ("logged in"). Blocked requests are instead redirected to the BT-WiFi-with-FON login web page where the user can enter his/her username and password. After successful authentication, his/her web traffic is forwarded (without further blocking or redirection) to the Internet. With such an arrangement, the Internet address of the Pairing Initiation Server 450 is exempted from blocking—that is, a "pinhole" is provided through the captive portal, so that connection requests addressed to the Pairing Initiation Server 450 are not redirected to the login web page but instead pass directly to the Pairing Initiation Server 450. Of course, the system could be arranged so that more than one address, a range or ranges of addresses, are exempt from blocking—either to reach the Pairing Initiation Server 450 or some other server or service. But otherwise http requests to other addresses should redirect to a login page. Clearly, it would be possible to use a WLAN for which login is not a precondition for Internet access, in which case there would be no need for a captive portal and pinhole arrangement.

The device 310 then connects to the Pairing Initiation Server 450 and providing its Device ID (e.g. serial number, NIC address, MAC address, or the like) (e.g. using TR-069 or some other suitable application-layer protocol). The Pairing Initiation Server 450 then looks up the Device ID and maps it to the customer's User ID using the device database 465.

The Pairing Initiation Server 450 then looks up the identity/IP address of that customer's access point 325 and sends a special instruction to each of the WPS Pairing Initiator Client 445 of the access point 325 and the Pairing Initiation Client 440 of the new device 310 to initiate WPS pairing. The WPS Pairing Initiator Client 445 on the access point 325 then initiates WPS pairing on the access point 325 (this has the same effect as pushing the WPS button would have).

The Pairing Initiation Client 440 on the device 310, then triggers WPS pairing on the device 310 using the usual PBC approach. If the device 310 and the access point 325 are in Wi-Fi range of each other and the pairing is successful, setup is then complete for the customer. If not, the device reports that pairing has failed (e.g. through flashing light or GUI display), and the user must manually pair the new device with the hub (e.g. through physically pressing the WPS buttons on the hub and repeater).

Figure 4:
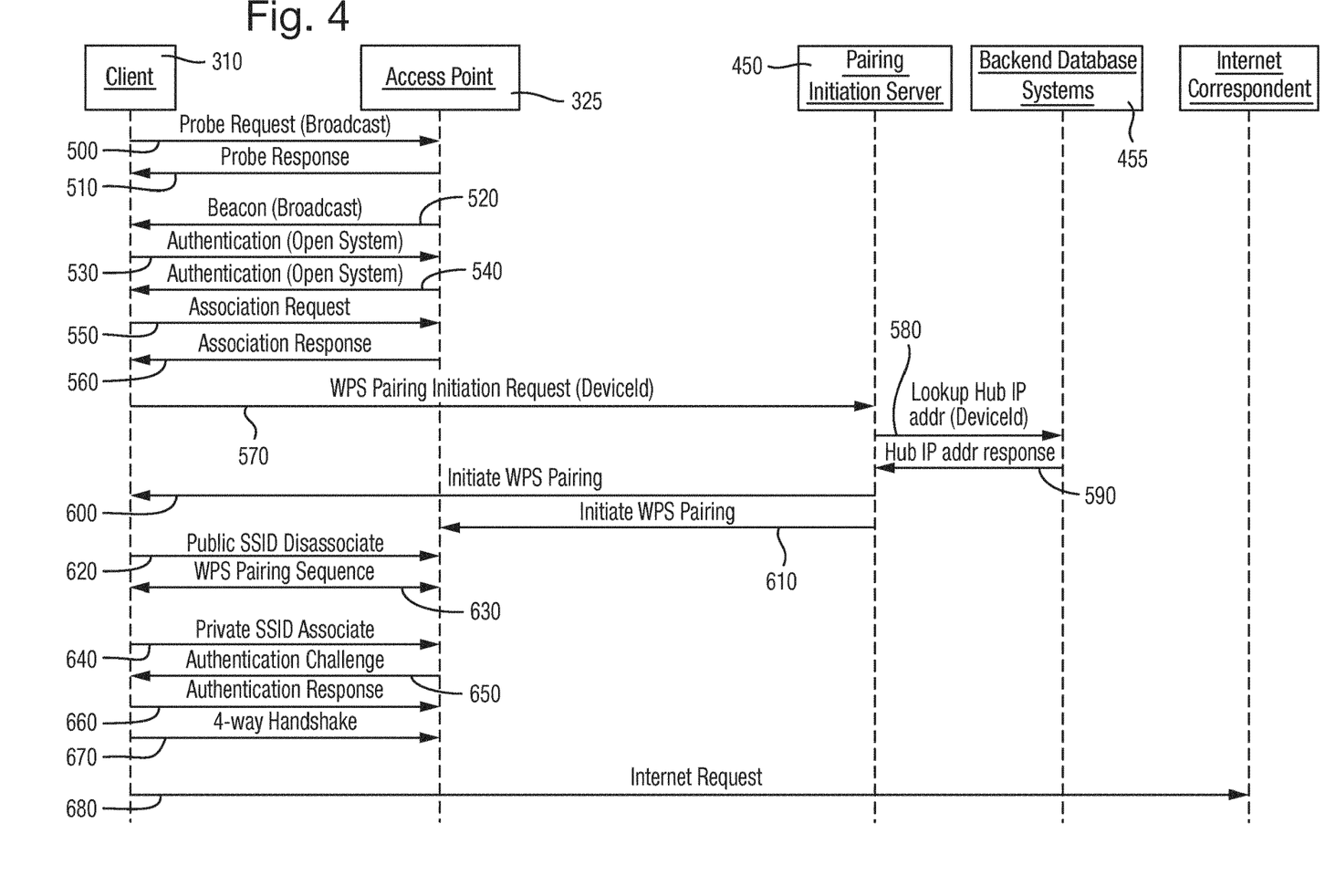
FIG. 4 is a messaging diagram showing the sequence of messages exchanged between various entities that together provide the automatic pairing method according to an embodiment of the disclosure.

FIG. 4 shows an exemplary message exchange sequence for a method according to an embodiment of the disclosure. The sequence has been simplified somewhat, in that it does not include ACK messages from the various actors. Also, the initial exchange, in 500 and 510, takes place only if the new device is actively scanning for access points, whereas the second exchange, in 520 and 530, represents what happens if the new device is using passive scanning. A choice can be made between these two approaches: clearly they do not both need to take place. The fact that the device initially connects with an open network means that the initial authentication and association between the device and the access point, in 530 to 560, takes place without credentials.

This is followed by the WPS pairing initiation request from the device to the Pairing Initiation Server 450 which includes the device ID for device 310. At 580 the Pairing Initiation Server performs the database check, using the received device ID, to determine the ID for the corresponding access point 325. This access point ID is returned, in 590, as the IP address of the access point 325.

The Pairing Initiation Server then instructs the Pairing Initiation Clients, in the access point and the device, in 600 and 610, to initiate WPS pairing (using PBC). In 620, the device 310 disassociates from the public SSID, and this is followed in 630 by the WPS pairing process.

Thereafter, in 640 to 670, association with the private SSID takes place, giving the device 310 secure access to the user's private WLAN 320. Subsequently, in 680 the device 310 obtains access to the Internet.

An electronic device according to an embodiment of the disclosure may include a smartphone, a tablet computer, a mobile phone, a video telephone, an electronic book reader, a desktop computer, a laptop computer, a netbook computer, a server, a personal digital assistant, a portable multimedia player, an MP3 player, a mobile medical device, a camera, or a wearable device.

An electronic device according to an embodiment of the disclosure may also be a home appliance, such as a television, a media streaming device, a video projector, a DVD player, a PVR, an audio device, a refrigerator, a thermostat, a heating controller, a heater, a central heating boiler, an air conditioner, an oven, a microwave oven, a washing machine, a coffee machine, weighing scales, a set-top box, a game console, or a TV box (e.g. Apple TV®, or Google TV®), or a security device—such as a security camera or fire alarm, or a utility meter such as a water meter, electricity meter, or gas meters, etc. An electronic device according to an embodiment of the disclosure may also be an exercise device, or a medical device (e.g., a portable medical measurement device, such as a blood glucose monitoring device, a heartbeat measuring device, a blood pressure measuring device, a body temperature measuring device, etc.). Any of the preceding devices could be an Internet of Things device.

The invention claimed is:

1. A method for the automatic pairing of a device wirelessly with a secure wireless local area network (LAN) provided by an access point, wherein the access point is a pairing access point providing the secure wireless LAN and an open wireless LAN, the method comprising:
    associating the device with an access point of an open wireless LAN;
    sending a pairing initiation request from the device to the associated access point of the open wireless LAN, the pairing initiation request including a destination address for a pairing initiation server and an identifier for the device;
    forwarding the pairing initiation request from the associated access point to the pairing initiation server;
    using the device identifier received by the pairing initiation server to query a database to determine a network address for the pairing access point;
    sending a pairing initiation instruction from the pairing initiation server to the pairing access point using the determined network address;
    sending a pairing initiation instruction from the pairing initiation server to the device;
    responsive to receipt by the pairing access point of the instruction sent by the pairing initiation server to the pairing access point, initiating pairing between the pairing access point and the device; and
    responsive to receipt by the device of the instruction sent by the pairing initiation server to the device, automatically triggering at the device pairing between the device and the secure wireless LAN.

2. The method as claimed in claim 1, wherein the pairing between the pairing access point and the device, and between the device and the secure wireless LAN is Wireless Protected Setup (WPS).

3. The method as claimed in claim 1, wherein a captive portal is provided for the open wireless LAN by the pairing access point to redirect HTTP requests to a login page, the captive portal being so arranged that HTTP requests addressed to the pairing initiation server bypass the login page.

4. A device capable of connecting wirelessly with a secure wireless LAN provided by an access point, wherein the access point is a pairing access point providing the first secure wireless LAN and an open wireless LAN, the device comprising:
    a memory storing a network address of a pairing initiation server and a network identity for one or more open wireless LANs, including the open wireless WLAN provided by the pairing access point, through which the pairing initiation server can be reached;
    a pairing initiation client configured to:
        associate the device with an access point of an open wireless LAN whose network identity is stored in the memory,
        send a pairing initiation request from the device to the associated access point of the open wireless LAN, the pairing initiation request including an identifier for the device and having as a destination address the stored address of the pairing initiation server,
        in response to receiving an instruction from the pairing initiation server, trigger, at the device, pairing between the device and the secure wireless LAN provided by the pairing access point that has also been instructed by the pairing initiation server to initiate a pairing process.

5. The device as claimed in claim 4, wherein the device is a smartphone, a tablet computer or an Internet of Things device.

6. A system comprising:
    a pairing initiation server in combination with a database, the database storing device identities for devices capable of connecting wirelessly with a wireless LAN, each device identity being mapped to a corresponding user identity, and each user identity being mapped to a network address of an access point of a secure wireless LAN, so that knowing a device identity permits recovery of a network address of an access point of a secure wireless LAN, access to the secure wireless LAN requiring authentication;
    the pairing initiation server being configured to:
        query the database, in response to receiving a device identity, to retrieve a network address of an access point of a secure wireless LAN, access to the secure wireless LAN requiring authentication;
        send a pairing initiation instruction to an access point of a secure wireless LAN, wherein the access point is a pairing access point, using the retrieved network address to cause the pairing access point to initiate pairing with the device whose identity was received; and
        send a pairing initiation instruction to the device whose identity was received, to cause automatic triggering at the device of pairing between the device and the pairing access point.

* * * * *